(12) United States Patent
Okawa et al.

(10) Patent No.: US 8,124,255 B2
(45) Date of Patent: Feb. 28, 2012

(54) MAGNETIC RECORDING MEDIUM AND MAGNETIC RECORDING AND REPRODUCING APPARATUS

(75) Inventors: Shuichi Okawa, Tokyo (JP); Kazuhiro Hattori, Tokyo (JP); Narutoshi Fukuzawa, Tokyo (JP); Takahiro Suwa, Tokyo (JP)

(73) Assignee: TDK Corporation, Tokyo (JP)

( * ) Notice: Subject to any disclaimer, the term of this patent is extended or adjusted under 35 U.S.C. 154(b) by 210 days.

(21) Appl. No.: 12/457,194

(22) Filed: Jun. 3, 2009

(65) Prior Publication Data

US 2009/0310255 A1 Dec. 17, 2009

(30) Foreign Application Priority Data

Jun. 17, 2008 (JP) ................................. 2008-158430
Mar. 25, 2009 (JP) ................................. 2009-074662

(51) Int. Cl.
*G11B 5/65* (2006.01)

(52) U.S. Cl. .................................................. 428/836.2

(58) Field of Classification Search .................. 428/836
See application file for complete search history.

(56) References Cited

U.S. PATENT DOCUMENTS

| | | | |
|---|---|---|---|
| 6,014,296 A | 1/2000 | Ichihara et al. | |
| 6,583,957 B1 | 6/2003 | Takeshita et al. | |
| 6,586,044 B1 | 7/2003 | Takeshita et al. | |
| 2006/0098343 A1 | 5/2006 | Hattori et al. | |
| 2006/0188751 A1* | 8/2006 | Okawa et al. ................. | 428/826 |
| 2007/0196565 A1* | 8/2007 | Suwa et al. .................... | 427/127 |

FOREIGN PATENT DOCUMENTS

| | | |
|---|---|---|
| JP | A-9-97419 | 4/1997 |
| JP | A-2000-195042 | 7/2000 |
| JP | A-2006-139821 | 6/2006 |

OTHER PUBLICATIONS

U.S. Appl. No. 12/314,996, filed Dec. 19, 2008 in the name of Suichi Okawa et al.

* cited by examiner

*Primary Examiner* — Holly Rickman
*Assistant Examiner* — Linda Chau
(74) *Attorney, Agent, or Firm* — Oliff & Berridge, PLC

(57) ABSTRACT

A highly reliable magnetic recording medium is provided which has a recording layer formed in a concavo-convex pattern and wherein the recording layer is unlikely to cause a change in magnetic properties. The magnetic recording medium includes a substrate, a recording layer formed in a predetermined concavo-convex pattern over the substrate, convex portions of the concavo-convex pattern serving as recording elements; and a filler portion filling a concave portion between the recording elements. The filler portion comprises a metal-based main filler material and oxygen. Oxygen is unevenly distributed in the filler portion so that the ratio of the number of oxygen atoms to the total of the number of atoms of the main filler material and the number of oxygen atoms is greater in an upper surface portion of the filler portion than in a lower portion of the filler portion.

4 Claims, 9 Drawing Sheets

MAGNETIC RECORDING MEDIUM AND MAGNETIC RECORDING AND REPRODUCING APPARATUS

TECHNICAL FIELD

The present invention relates to a magnetic recording medium having a recording layer formed in a concavo-convex pattern, and a magnetic recording and reproducing apparatus including the same.

BACKGROUND ART

A significant improvement in the areal density of conventional magnetic recording media such as hard disks has been achieved by, for example, reducing the size of magnetic particles constituting a recording layer, changing materials, and improving the precision of head processing. Further improvements in areal density are also expected in the future. The improvements in areal density by means of conventional improvement techniques are approaching their limit, however, due to the advent of problems such as processing limits with respect to the magnetic heads, erroneous recording of information on tracks adjoining an intended track ascribable to a spreading recording field, and crosstalk during reproduction.

Discrete track media and patterned media have been proposed as promising magnetic recording media that are capable of providing a further improvement in areal density. In these media, a recording layer is formed in a concavo-convex pattern including the convex portions of the concavo-convex pattern that serve as recording elements (for example, see Patent Literature 1). Meanwhile, for magnetic recording media such as hard disks, the surface flatness is a significant factor in stabilizing the head flying height in order to provide favorable recording and reproducing characteristics. It is therefore desirable to deposit a filler material over the recording layer formed in a concavo-convex pattern so as to fill the concave portions between the recording elements with the filler material, and remove an excess of the filler material over the recording layer so that the recording elements and the filler material are flattened at the top. The filler material may be oxides which are nonmagnetic and chemically stable (for example, see Patent Literature 2). The filler material may be deposited to fill the concave portions by using sputtering or other techniques. In order to remove any excess filler material and thereby provide surface flattening, techniques such as chemical mechanical polishing (CMP) or dry etching can be used.

CITATION LIST

Patent Literature

Patent Literature 1: Japanese Patent Application Laid-Open No. Hei 9-97419
Patent Literature 2: Japanese Patent Application Laid-Open No. 2006-139821

SUMMARY OF INVENTION

Technical Problem

The use of oxides as the filler material, however, has had the problem that the recording layer can change in magnetic properties over time.

In view of the foregoing problems, various exemplary embodiments of this invention provide a highly reliable magnetic recording medium having a recording layer formed in a concavo-convex pattern where the recording layer is unlikely to cause a change in magnetic properties, and a magnetic recording and reproducing apparatus including the same.

Solution to Problem

The foregoing object of the present invention has been achieved by the provision of a magnetic recording medium including: a substrate; a recording layer formed in a predetermined concavo-convex pattern over the substrate, convex portions of the concavo-convex pattern serving as recording elements; and a filler portion filling a concave portion between the recording elements, wherein the filler portion comprises a metal-based main filler material and oxygen, the oxygen being unevenly distributed in the filler portion so that a ratio of number of oxygen atoms to a total of number of atoms of the main filler material and the number of oxygen atoms is greater in an upper surface portion of the filler portion than in a lower portion of the filler portion.

In the process of achieving the invention, the inventors have made intensive studies on the cause of secular changes in the magnetic properties of the recording layer when oxides are used as the filler material. In consequence, the inventors have inferred that the oxygen contained in the filler material diffuses into the recording elements to change the magnetic properties of the recording elements.

In the magnetic recording medium described above, oxygen is unevenly distributed in the filler portion so that the ratio of the number of oxygen atoms is greater in the upper surface portion of the filler portion than in the lower portion of the filler portion. The upper surface portion with great oxygen ratio is less susceptible to chemical changes and is stable even if exposed to oxygen and the like in the air. Meanwhile, since the ratio of the number of oxygen atoms is less in the lower portion of the filler portion than in the upper surface portion of the filler portion, it is possible to prevent or suppress the diffusion of oxygen from the lower portion of the filler portion to the recording elements. This can prevent or suppress changes in the magnetic properties of the recording layer.

Accordingly, various exemplary embodiments of this invention provide a magnetic recording medium comprising: a substrate; a recording layer formed in a predetermined concavo-convex pattern over the substrate, convex portions of the concavo-convex pattern serving as recording elements; and a filler portion filling a concave portion between the recording elements, wherein the filler portion comprises a metal-based main filler material and oxygen, the oxygen being unevenly distributed in the filler portion so that a ratio of number of oxygen atoms to a total of number of atoms of the main filler material and the number of oxygen atoms is greater in an upper surface portion of the filler portion than in a lower portion of the filler portion.

In the description of the present application, the phrase "a recording layer formed in a concavo-convex pattern, convex portions of the concavo-convex pattern serving as recording elements" is used to refer to a recording layer that is formed by dividing a continuous recording layer into a predetermined pattern so that the convex portions serving as the recording elements are completely separated from each other. In addition, the above phrase is also used to include a recording layer that has mutually separated convex portions in data regions, and the convex portions are continuous near boundaries between the data regions and servo regions, a recording layer that is continuously formed on part of the substrate, such as one having a spiral configuration, a recording layer that is formed on top surfaces of convex portions and the bottom surfaces of concave portions of a concavo-convex patterned underlayer separately so that the portions formed on the top surfaces of the convex portions constitute recording elements, a recording layer that has concave portions formed halfway in the thickness direction and is continuous at the bottoms of the concave portions, and a recording layer of a continuous film that is deposited in a concavo-convex pattern following a concavo-convex pattern of a layer below the recording layer.

In the description of the present application, a "metal-based material" is used to refer to a material that is made of a metal element, a material that is made of a semimetal element such as Si and a composite material that is made of metal and semimetal elements. Note that carbon shall be excluded from the semimetal elements in the present application.

In the description of the present application, the term "the upper surface portion of the filler portion" is used to refer to the surface of the filler portion opposite from the substrate and a part adjacent to the surface.

In the description of the present application, the term "the lower portion of the filler portion" is used to refer to a part of the filler portion that is closer to the substrate than the upper surface portion.

In the description of the present application, the phrase "the ratio of the number of oxygen atoms to the total of the number of atoms of the main filler material and the number of oxygen atoms is greater in an upper surface portion of the filler portion than in a lower portion of the filler portion" is not limited to situations where oxygen lies across the entire filler portion, such as when oxygen is contained in a less ratio in the lower portion of the filler portion than in the upper surface portion of the filler portion and when the ratio of the number of oxygen atoms decreases from the upper surface portion side to the substrate side of the filler portion. The phrase is also used to include situations where oxygen lies substantially only in the upper surface portion of the filler portion while the lower portion of the filler portion contains substantially no oxygen.

In the description of the present application, the term "magnetic recording medium" is not limited to media, such as hard disks, FLOPPY (Registered Trade Mark) disks, and magnetic tapes, that use only magnetism for information recording and reproducing. The term is also used to refer to magneto-optical recording media, such as MO (Magneto Optical) disks, that use magnetism and light in combination, and heat assisted type recording media that use magnetism and heat in combination.

Advantageous Effects of Invention

According to various exemplary embodiments of the present invention, it is possible to achieve a highly reliable magnetic recording medium having a recording layer formed in a concavo-convex pattern where the recording layer is unlikely to cause a change in magnetic properties, and a magnetic recording and reproducing apparatus including the same.

DESCRIPTION OF EMBODIMENTS

Hereinafter, preferred exemplary embodiments of the present invention will be described in detail with reference to the drawings.

Figure 1:
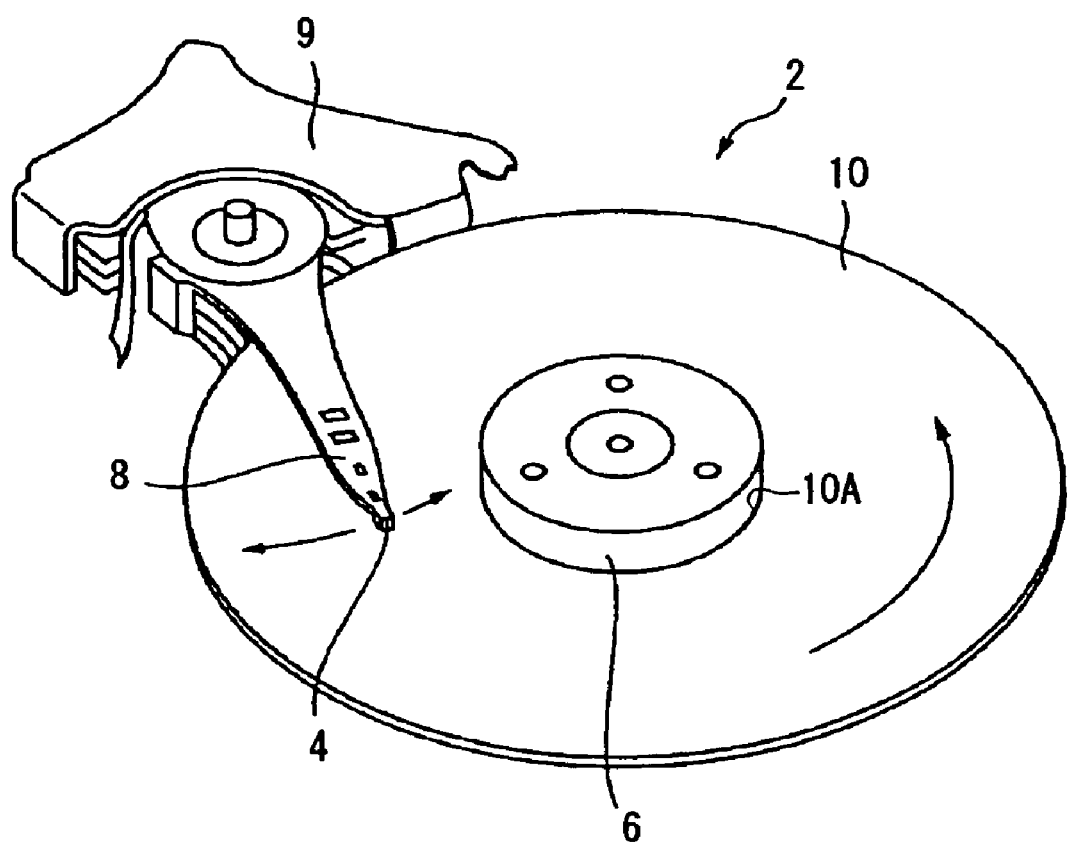
FIG. 1 is a perspective view schematically showing a general structure of a magnetic recording and reproducing apparatus according to a first exemplary embodiment of the present invention.

As shown in FIG. 1, a magnetic recording and reproducing apparatus 2 according to a first exemplary embodiment of the present invention includes a magnetic recording medium 10 and a magnetic head 4. The magnetic head 4 is arranged so as to be capable of flying near the surface of the magnetic recording medium 10 in order to record and reproduce a magnetic signal on/from the magnetic recording medium 10.

The magnetic recording medium 10 has a center hole 10A. The magnetic recording medium 10 is fixed at the center hole 10A to a chuck 6 so that it can rotate with the chuck 6. The magnetic head 4 is mounted on near the tip end of an arm 8. The arm 8 is rotatably attached to the base 9. Consequently, the magnetic head 4 can be moved near the surface of the magnetic recording medium 10, in an arc orbit along a radial direction of the magnetic recording medium 10.

Figure 2:
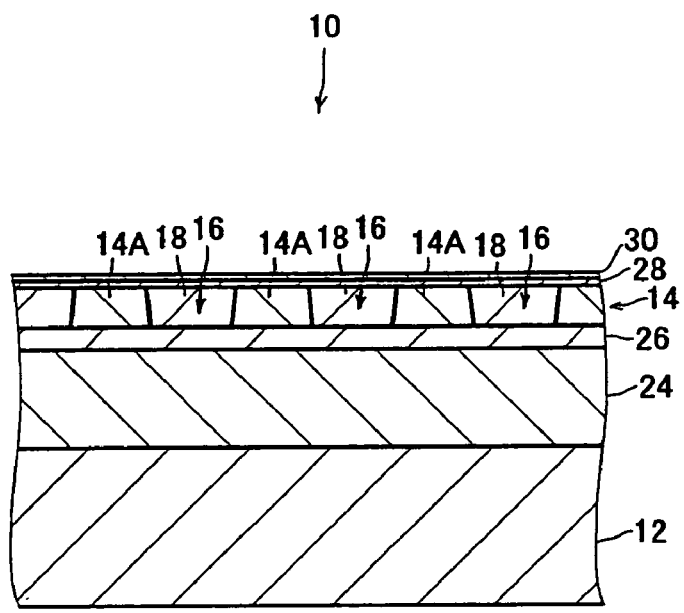
FIG. 2 is a radial sectional view schematically showing the structure of a magnetic recording medium of the magnetic recording and reproducing apparatus.
Figure 3:
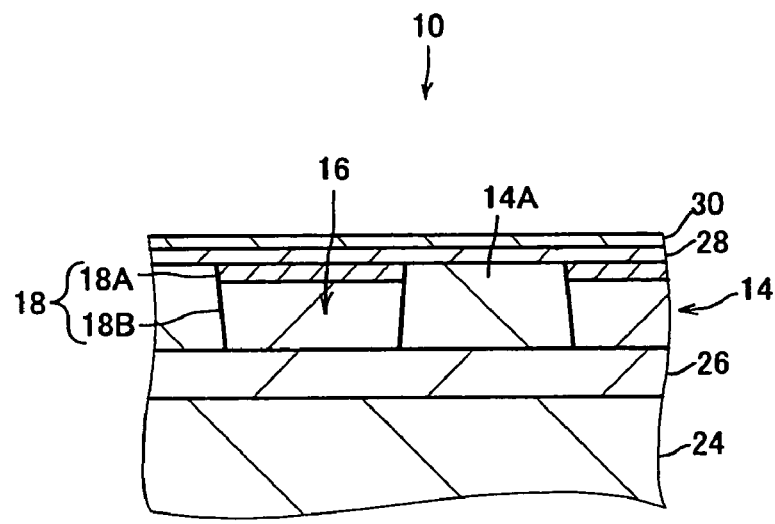
FIG. 3 is an enlarged radial sectional view showing the structure of a filler portion of the magnetic recording medium.

The magnetic recording medium 10 is a discrete track medium of perpendicular recording type. As shown in FIGS. 2 and 3, the magnetic recording medium 10 has a substrate 12, a recording layer 14 that is formed in a predetermined concavo-convex pattern over the substrate 12 so that the convex portions of the concavo-convex pattern serve as recording elements 14A, and filler portions 18 that fill the concave portions 16 between the recording elements 14A. The filler portion 18 substantially consists of a metal-based main filler material and oxygen. Oxygen is unevenly distributed in the filler portion 18 so that the ratio of the number of oxygen atoms to the total of the number of atoms of the main filler material and the number of oxygen atoms is greater in an upper surface portion 18A of the filler portion 18 than in a lower portion 18B of the filler portion 18. The rest of the configuration does not seem to be particularly important to understanding this first exemplary embodiment, and the description thereof will thus be omitted as appropriate.

The magnetic recording medium 10 includes a soft magnetic layer 24, a seed layer 26, the recording layer 14, a protective layer 28, and a lubricant layer 30, and these layers are formed over the substrate 12 in that order.

The substrate 12 has a generally disk-like shape with a center hole. The substrate 12 may be made of materials such as glass, Al, and $Al_2O_3$.

The recording layer 14 has a thickness of 5 to 30 nm. The recording layer 14 may be made of materials including a CoPt-based alloy such as a CoCrPt alloy, an FePt-based alloy, a stacked layer thereof, or a material formed of an oxide material forming a matrix, such as $SiO_2$, and ferromagnetic particles contained in the matrix, such as CoCrPt particles. In a data region, the convex portions of the recording layer 14, i.e., the recording elements 14A are formed as a large number of concentric arcs radially separated at microscopic intervals, as shown in FIGS. 2 and 3. In the data region, the recording elements 14A have a radial width of 10 to 100 nm at the top surface height. The concave portions 16 have a radial width of 10 to 100 nm at the same height as the top surfaces of the recording elements 14A. In a servo region, the recording elements 14A are formed in a predetermined servo pattern (not shown).

The filler portion 18, as described above, comprises oxygen in an uneven distribution such that the ratio of the number of oxygen atoms to the total of the number of atoms of the main filler material and the number of oxygen atoms is greater in the upper surface portion 18A of the filler portion 18 than in the lower portion 18B of the filler portion 18. In other words, the filler portion 18 is configured so that the ratio of the number of oxygen atoms in the upper half (on the side farther from the substrate 12) of the filler portion 18 in the thickness direction is greater than the ratio of the number of oxygen atoms in the lower half (on the side closer to the substrate 12) of the filler portion 18 in the thickness direction. The main filler material that forms the filler portions 18 preferably is a metal based material that contains at least one of a semimetal element Si, metal elements Al, Ti, Ta, Nb, Zr, Au, Cu, Ir, Ru, Pt, Rh, Cr, W, and Zn. The main filler material may be an alloy of Al, Ti, Ta, Nb, Zr, Au, Cu, Ir, Ru, Pt, Rh, Cr, W, and/or Zn. The upper surface portion 18A of the filler portion 18 is preferably made of oxides of such main filler materials. If the upper surface portion 18A is sufficiently chemically stable, the filler portion 18 may contain molecules and/or atoms other than the oxides of the main filler materials. For example, nitrogen may be contained. The lower portion 18B of the filler portion 18 is preferably oxygen-free. Alternatively, the lower portion 18B may contain oxygen in a ratio less than that of the upper surface portion 18A. If the upper surface portion 18A and the lower portion 18B of the filler portion 18 have a clear difference in the ratio of the number of oxygen atoms, the upper surface portion 18A preferably has a thickness of 1 to 5 nm. It is also preferable that the thickness of the upper surface portion 18A falls to or below ¼ the thickness of the recording layer 14. The ratio of the number of oxygen atoms in the filler portion 18 may decrease substantially continuously from the side of the upper surface portion 18A of the filler portion 18 to the side of the substrate 12. Alternatively, the lower portion 18B of the filler portion 18 may be substantially free of oxygen while the ratio of the number of oxygen atoms in the upper surface portion 18A of the filler portion 18 decreases substantially continuously from the side of the upper surface portion 18A of the filler portion 18 to the side of the substrate 12. The lower portion 18B of the filler portion 18 may contain a significantly small amount of oxygen as compared to the oxygen content in the upper surface portion 18A, while the ratio of the number of oxygen atoms in the upper surface portion 18A of the filler portion 18 decreases substantially continuously from the side of the upper surface portion 18A of the filler portion 18 to the side of the substrate 12. Note that when the ratio of the number of oxygen atoms decreases within the upper surface portion 18A of the filler parts 18 or across the entire filler portion 18 from the side of the upper surface portion 18A of the filler portion 18 to the side of the substrate 12, the ratio of the number of oxygen atoms may decrease either monotonously or with some fluctuations (increases and decreases) such that the intermediate value of the fluctuations decreases in a macroscopic sense.

The soft magnetic layer 24 has a thickness of 50 to 300 nm. The soft magnetic layer 24 may be made of a material such as an Fe alloy or a Co alloy.

The seed layer 26 has a thickness of 2 to 40 nm. The seed layer 26 may be made of a material such as a nonmagnetic CoCr alloy, Ti, Ru, a stacked layer of Ru and Ta, or MgO.

The protective layer 28 has a thickness of 1 to 5 nm. The protective layer 28 may be made of diamond-like carbon (DLC).

The lubricant layer 30 has a thickness of 1 to 2 nm. The lubricant layer 30 may be made of perfluoropolyether (PFPE).

A description will now be given of the operation of the magnetic recording medium 10.

The magnetic recording medium 10 has the filler portion 18 in which oxygen is unevenly distributed so that the ratio of the number of oxygen atoms is greater in the upper surface portion 18A of the filler portion 18 than in the lower portion 18B of the filler portion 18. The upper surface portion 18A with great oxygen ratio is less susceptible to chemical changes and is stable even if exposed to oxygen and the like in the air. Meanwhile, since the ratio of the number of oxygen atoms is less in the lower portion 18B of the filler portion 18 than in the upper surface portion 18A of the filler portion 18, it is possible to prevent or suppress the diffusion of oxygen from the lower portion 18B of the filler portion 18 to the recording elements 14A. This can prevent or suppress changes in the magnetic properties of the recording layer 14.

Figure 4:
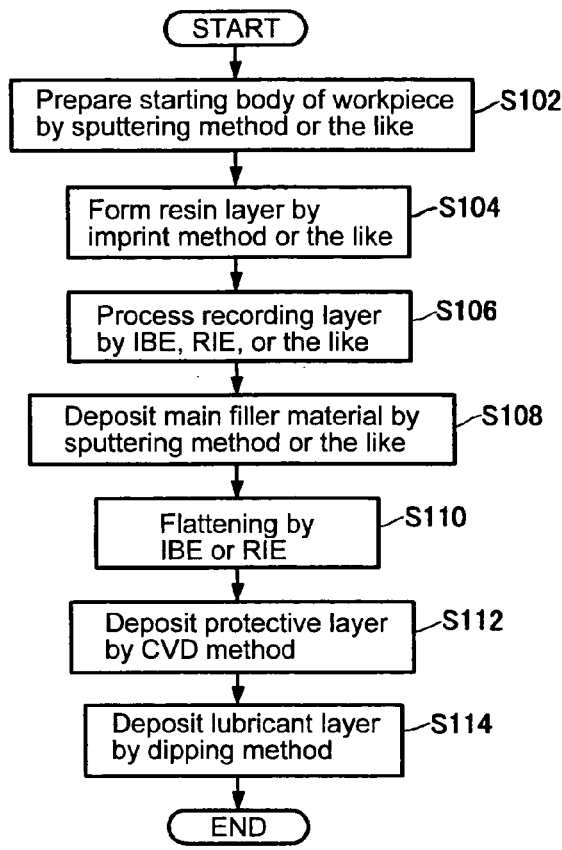
FIG. 4 is a flowchart showing outline of manufacturing steps of the magnetic recording medium.

A description will now be given of a method for manufacturing the magnetic recording medium 10 with reference to the flowchart shown in FIG. 4.

Figure 5:
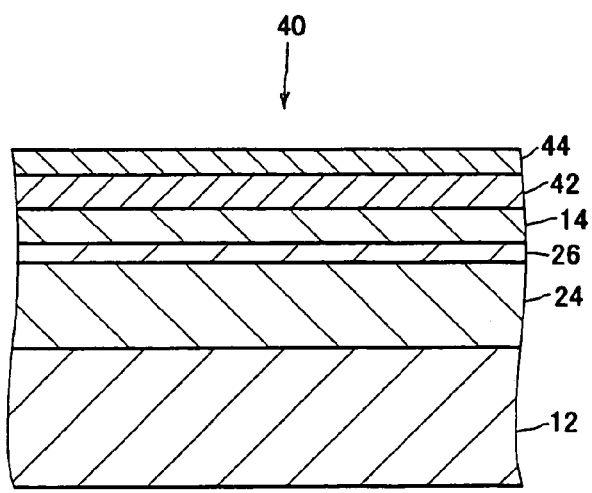
FIG. 5 is a radial sectional view schematically showing the structure of a starting body of a workpiece in the manufacturing steps.

Initially, a starting body of a workpiece 40 shown in FIG. 5 is prepared (S102). The starting body of the workpiece 40 is obtained by depositing the soft magnetic layer 24, the seed layer 26, the recording layer 14 (being a continuous film before being processed into the concavo-convex pattern), a first mask layer 42, and a second mask layer 44 over the substrate 12 in that order using a sputtering method or the like.

The first mask layer 42 has a thickness of 2 to 50 nm. The first mask layer 42 may be made of a material that is mainly composed of C (carbon), like DLC. The second mask layer 44 has a thickness of 2 to 30 nm. The second mask layer 44 may be made of Ni or the like.

Figure 6:
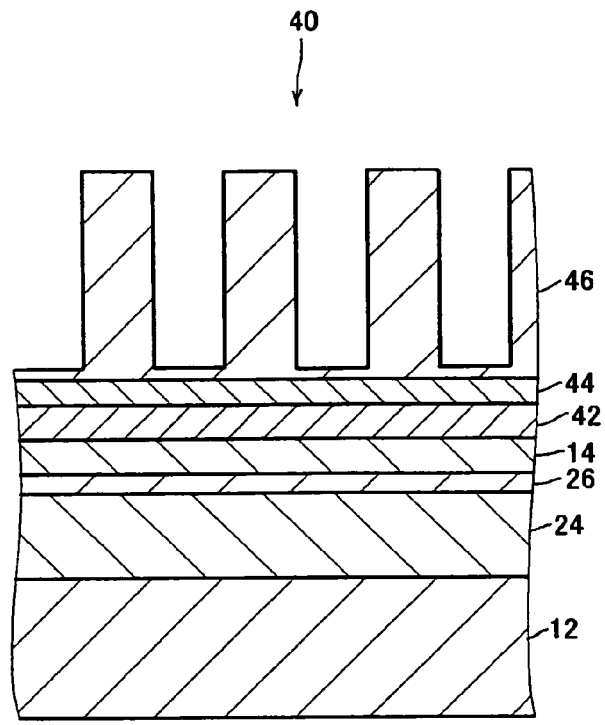
FIG. 6 is a radial sectional view schematically showing the configuration of the workpiece on which a resin layer of concavo-convex pattern is formed.

Next, as shown in FIG. 6, a resin material is applied to the second mask layer 44 of the workpiece 40 using a spin coating method. Then, a concavo-convex pattern corresponding to that of the recording layer 14 is transferred to the resin material by an imprint method using a stamper (not shown), whereby a resin layer 46 having the concavo-convex pattern is formed (S104). The imprint methods available include optical imprinting using ultraviolet rays or the like, thermal imprinting, and the like. For optical imprinting, the resin layer 46 may be made of a material such as a UV curable resin. For thermal imprinting, the resin layer 46 may be made of a material such as a thermoplastic resin. The resin layer 46 has a thickness (corresponding to the thickness of the convex portions) of 10 to 300 nm, for example. A photosensitive resist or an electron beam resist may also be used as the resin material, in which case the resin layer 46 having a concavo-convex pattern corresponding to that of the recording layer 14 may be formed by optical lithography or electron beam lithography. The resin layer 46 at the bottoms of the concave portions is removed by ashing or the like.

Figure 7:
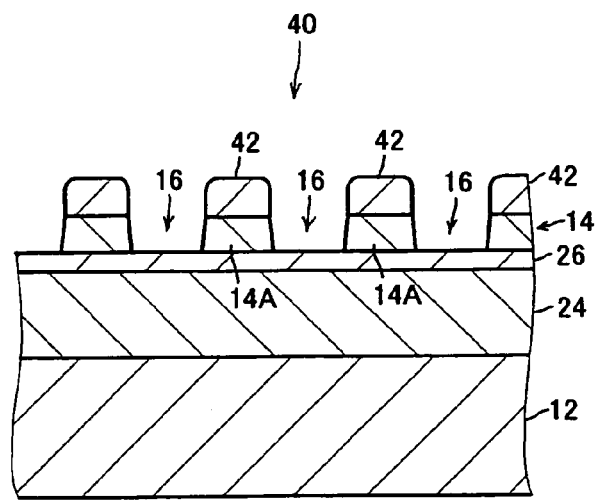
FIG. 7 is a radial sectional view schematically showing the configuration of the workpiece in which a recording layer is processed in a concavo-convex pattern.

Next, the second mask layer 44 at the bottoms of the concave portions is removed by ion beam etching (IBE) or reactive ion etching (RIE) using an inert gas such as Ar gas. Then the first mask layer 42 at the bottoms of the concave portions is removed by IBE or REI using $O_2$ gas. The recording layer 14 at the bottoms of the concave portions is further removed by IBE or RIE using an inert gas such as Ar gas (S106). This forms the recording layer 14 with the concavo-convex pattern which is divided in a large number of recording elements 14A as shown in FIG. 7. The first mask layer 42 remaining on the top surfaces of the recording elements 14A is removed by IBE or RIE using a nitrogen- or hydrogen-containing gas such as $N_2$ gas, $NH_3$ gas, and $H_2$ gas.

In the description of the present application, the term "IBE" is used to refer collectively to processing methods for irradiating a workpiece with an ionized gas to remove a target material, like ion milling. In the description of the present application, the term "RIE" is used as long as the etching is performed in an RIE apparatus even when using an inert gas or other gases that will not chemically react with the object to be processed.

Figure 8:
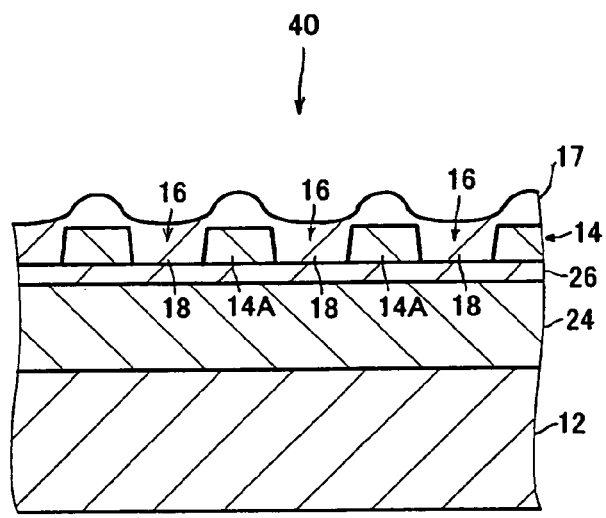
FIG. 8 is a radial sectional view schematically showing the configuration of the workpiece in which a main filler material is deposited over the recording layer.

As shown in FIG. 8, a metal-based main filler material 17 is then deposited using a sputtering or bias sputtering method on the workpiece 40 which has the recording layer 14 formed in the concavo-convex pattern. This forms the filler portions 18 in the concave portions 16 between the recording elements 14A (S108). In this process, the vacuum chamber is initially supplied with only an inert gas such as Ar. When the deposition of the main filler material 17 proceeds until the top surface of the main filler material 17 in the concave portion 16 reaches a height several nanometers below the top surface of the recording element 14A, the vacuum chamber starts being supplied with an oxygen-containing gas such as $O_2$ gas in addition to the inert gas such as Ar. Here, the top surface of the recording element 14A is used to refer to the surface of the recording element 14A opposite from the substrate 12. The oxygen-containing gas is preferably prepared in plasma form. This deposits several nanometers of oxidized main filler material 17 near the top ends of the concave portions 16, under which the substantially-unoxidized main filler material 17 is deposited. The ratio of the inert gas such as Ar and the oxygen-containing gas such as $O_2$ gas may be constant. Alternatively, the ratio may be changed, for example, so that a ratio of the oxygen-containing gas increases gradually. Furthermore, the oxygen-containing gas may be supplied, only while depositing the main filler material 17, to several nanometers near the top end of the concave portion 16, for example. Then, the vacuum chamber may be supplied with only oxygen-free gases such as an inert gas when depositing upper portion of the main filler material 17 (being portion farther from the substrate 12 than the portion near the top end of the concave portion 16). The main filler material 17 is deposited also on the recording elements 14A so as to cover the recording layer 14.

Figure 9:
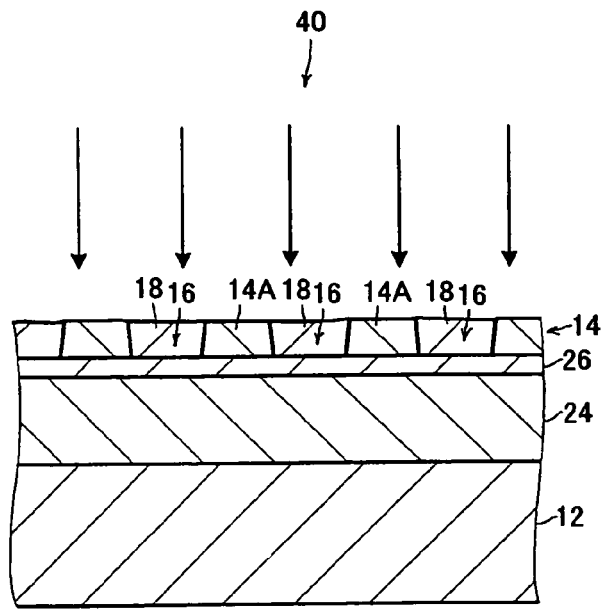
FIG. 9 is a radial sectional view schematically showing the configuration of the workpiece of which surface is flattened.

As shown in FIG. 9, an excess of the main filler material 17 is then removed by IBE or RIE using an inert gas such as Ar gas, whereby the surface of the workpiece 40 is flattened (S110). Here, the excess of the main filler material 17 is used to refer to the portions of the main filler material 17 lying on an upper side (on the side opposite from the substrate 12) of the level of the upper surface of the recording layer 14. The arrows in FIG. 9 schematically show the direction of irradiation with the processing gas.

Next, the protective layer 28 is formed over the recording elements 14A and the filler portions 18 by a CVD method (S112). The lubricant layer 30 is further applied to the protective layer 28 by a dipping method (S114). This completes the magnetic recording medium 10 shown in FIGS. 2 and 3 seen above.

Figure 10:
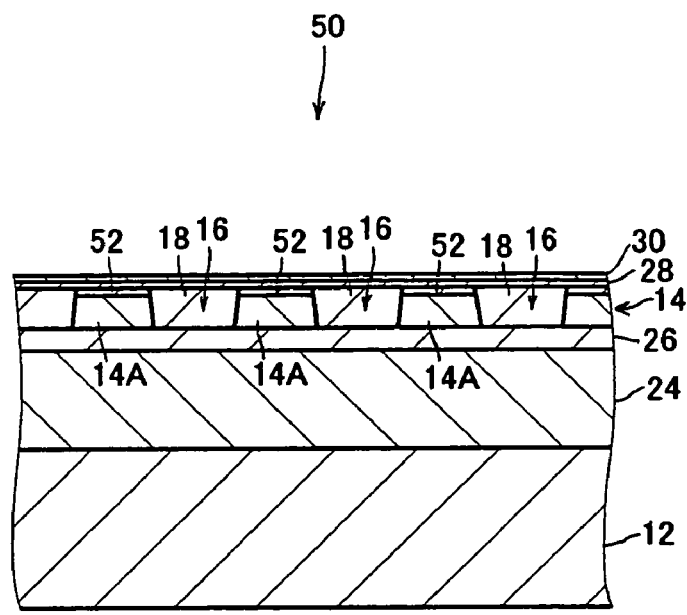
FIG. 10 is a radial sectional view schematically showing the structure of a magnetic recording medium according to a second exemplary embodiment of the present invention.
Figure 11:
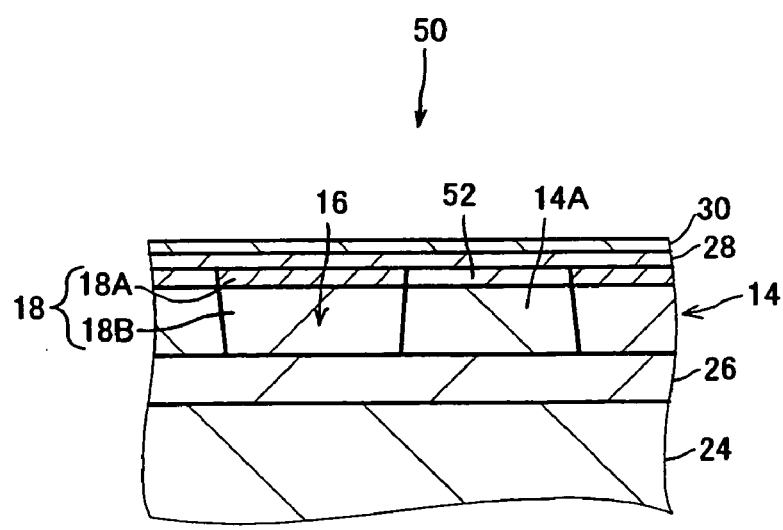
FIG. 11 is an enlarged radial sectional view showing the structure of a filler portion of the magnetic recording medium.

A description will now be given of a second exemplary embodiment of the present invention. In the magnetic recording medium 10 according to the foregoing first exemplary embodiment, the top surface of the recording element 14A is in contact with the protective layer 28. In contrast, as shown in FIGS. 10 and 11, a magnetic recording medium 50 according to the second exemplary embodiment has a barrier film 52 between the top surface of the recording element 14A and the protective layer 28. In other respects, the configuration is the same as that of the magnetic recording medium 10 according to the foregoing first exemplary embodiment. Like components will thus be designated by the same reference numerals as in FIGS. 1 to 9, and the description thereof will be omitted.

The barrier film 52 has a thickness of 1 to 5 nm. The barrier film 52 may be made of a material such as TaSi, Ti, TiN, or SiC. The barrier film 52 may also be made of a material such as Si, Ge, Mn, Ta, Nb, Mo, Zr, W, Al, Ni, Cu, Cr, Co, or an alloy or a compound (excluding oxides) thereof.

As described above, the barrier film 52 is formed between the recording element 14A and the protective layer 28, and the side surfaces of the barrier film 52 are in contact with the side surfaces of the upper surface portions 18A of the filler portions 18. Such configuration makes it possible to prevent the contact or reduce the contact area between the side surfaces of the upper surface portions 18A of the filler portions 18 and the side surfaces of the recording element 14A. This can prevent or reduce the diffusion of oxygen from the upper surface portions 18A of the filler portions 18 to the recording element 14A.

A description will now be given of a method for manufacturing the magnetic recording medium 50.

Figure 12:
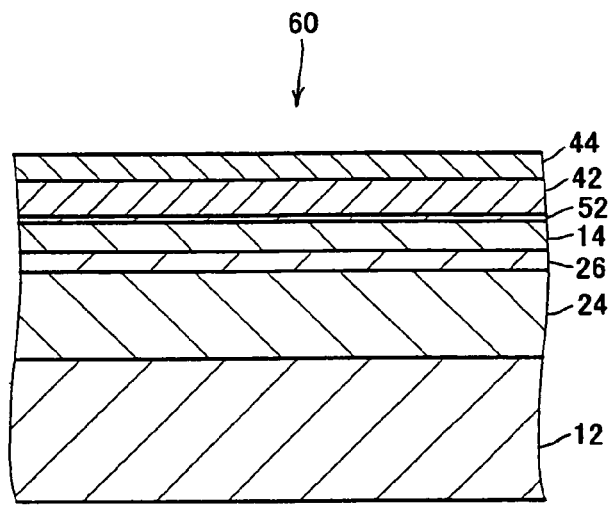
FIG. 12 is a radial sectional view schematically showing the structure of a starting body of a workpiece in the manufacturing steps of the magnetic recording medium.
Figure 13:
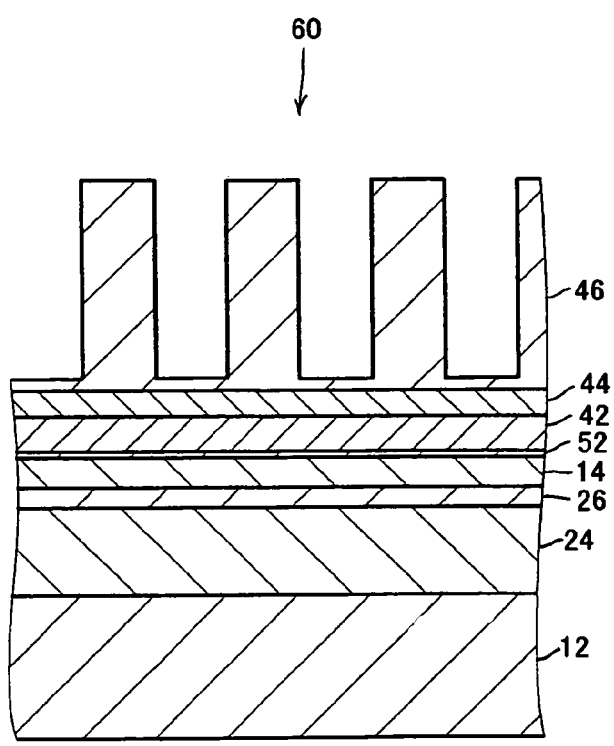
FIG. 13 is a radial sectional view schematically showing the configuration of the workpiece on which a resin layer of concavo-convex pattern is formed.
Figure 14:
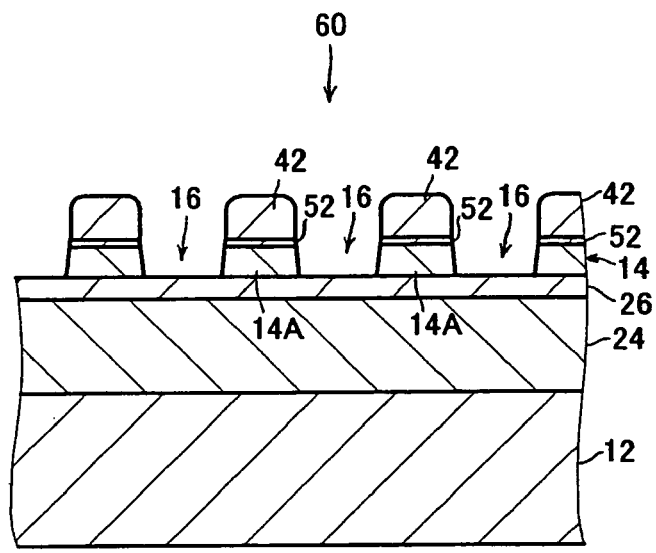
FIG. 14 is a radial sectional view schematically showing the configuration of the workpiece in which a recording layer and a barrier film are processed in a concavo-convex pattern.
Figure 15:
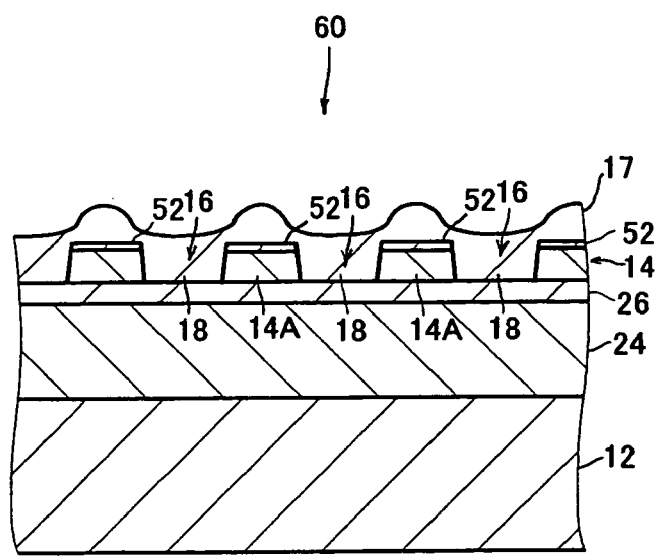
FIG. 15 is a radial sectional view schematically showing the configuration of the workpiece in which a main filler material is deposited over the recording layer and the barrier film.
Figure 16:
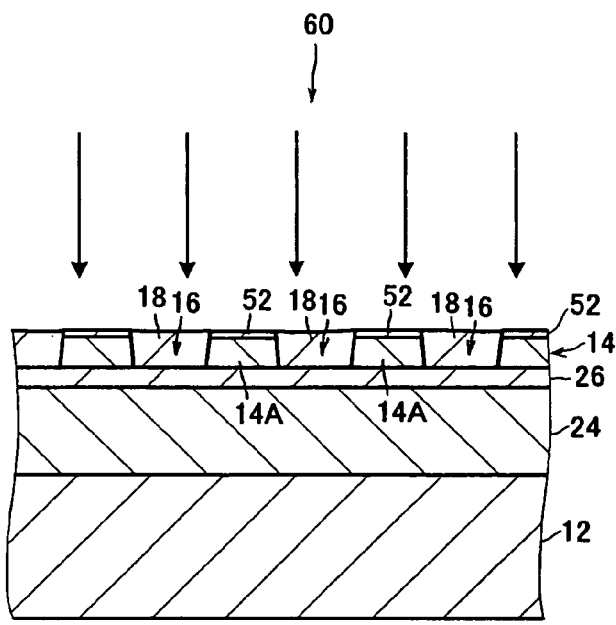
FIG. 16 is a radial sectional view schematically showing the configuration of the workpiece of which surface is flattened.

Initially, a workpiece 60 is prepared. As shown in FIG. 12, the workpiece 60 has the barrier film 52 (being a continuous film before being processed into a concavo-convex pattern) deposited between the recording layer 14 (being a continuous film before being processed into a concavo-convex pattern)

and the first mask layer 42 is prepared (S102). The barrier film 52 can be deposited by a sputtering method or the like as with the other layers.

As shown in FIGS. 13 to 16, the workpiece 60 is subjected to the resin layer forming step (S104), the recording layer processing step (S106), the step of removing the first mask layer 42, the main filler material depositing step (S108), and the flattening step (S110) as in the foregoing first exemplary embodiment. The resultant is further subjected to the protective layer depositing step (S112) and the lubricant layer depositing step (S114) to obtain the magnetic recording medium 50 shown in FIGS. 10 and 11.

In the recording layer processing step (S106), the recording layer 14 and the barrier film 52 are both removed from the concave portion bottoms. In the main filler material depositing step (S108), the vacuum chamber starts being supplied with an oxygen-containing gas such as $O_2$ gas in addition to the inert gas such as Ar when the deposition of the main filler material 17 proceeds until the top surface of the main filler material 17 in the concave portion 16 reaches a height several nanometers below the top surface of the barrier film 52 on the recording element 14A. For example, the oxygen-containing gas may be supplied, only when depositing the main filler material 17, at the heights corresponding to several nanometers near the top surface of the barrier film 52 on the recording element 14. In this case, the vacuum chamber may be supplied with only oxygen-free gases such as an inert gas when depositing the upper portion of the main filler material 17 (the portion farther from the substrate 12 than the portion near the top end of the concave portion 16). In the step of flattening (S110), an excess of the main filler material 17 lying on an upper side (on the side opposite from the substrate 12) of the level of the upper surface of the barrier film 52 is removed.

In the foregoing first and second exemplary embodiments, the filler portion 18 substantially consists of the metal-based main filler material and oxygen. However, the filler portion 18 may contain nitrogen aside from the main filler material of metal type and oxygen. Here, oxygen is unevenly distributed in the filler portion 18 so that the ratio of the number of oxygen atoms to the total of the number of atoms of the main filler material and the number of oxygen atoms is greater in the upper surface portion 18A of the filler portion 18 than in the lower portion 18B of the filler portion 18. Nitrogen may also be unevenly distributed in the filler portion 18 so that the ratio of the number of nitrogen atoms to the total of the number of atoms of the main filler material and the number of nitrogen atoms is greater in the upper surface portion 18A of the filler portion 18 than in the lower portion 18B of the filler portion 18. Such filler portion 18 containing not only oxygen but also nitrogen in an uneven distribution can be formed in the main filler material depositing step (S108), by starting to supply the vacuum chamber with an oxygen-containing gas such as $O_2$ and a nitrogen-containing gas such as $N_2$ gas in addition to the inert gas such as Ar when the deposition of the main filler material 17 proceeds until the top surface of the main filler material 17 in the concave portion 16 reaches a height several nanometers below the top surface of the recording element 14A or the top surface of the barrier film 52 on the recording element 14A.

In the foregoing first and second exemplary embodiments, the first mask layer 42, the second mask layer 44, and the resin layer 46 are formed over the continuous film of recording layer 14 before the recording layer 14 is divided into the concavo-convex pattern through the three stages of dry etching. Nevertheless, the materials of the mask layers and the resin layer, the number of layers to be stacked, the thicknesses of the layers, and the types of dry etching are not particularly limited as long as the recording layer 14 can be processed with high precision.

In the foregoing first and second exemplary embodiments, the soft magnetic layer 24 and the seed layer 26 are formed under the recording layer 14. Nevertheless, the configuration of the layers under the recording layer 14 may be modified as appropriate depending on the type of the magnetic recording medium. For example, an underlayer and/or an antiferromagnetic layer may be formed between the soft magnetic layer 24 and the substrate 12. Either one or both of the soft magnetic layer 24 and the seed layer 26 may be omitted. The recording layer may be formed directly on the substrate.

In the first and second exemplary embodiments, the magnetic recording medium 10 (50) is a discrete track medium of perpendicular recording type in which the recording layer 14 is divided at microscopic intervals in the radial direction of the tracks. It should be understood, however, that various exemplary embodiments of the present invention are also applicable to the following: a patterned medium having a recording layer that is divided at microscopic intervals both in the radial direction and the circumferential direction of the tracks; a magnetic disk having a recording layer of spiral configuration; a magnetic disk having a recording layer that is formed on the top surfaces of convex portions and the bottoms of concave portions of a concavo-convex patterned underlayer separately so that the portions formed on the top surfaces of the convex portions constitute recording elements; a magnetic disk having a recording layer with concave portions formed halfway in the thickness direction, so that the recording layer is continuous at the bottoms of the concave portions; and a magnetic disk having a recording layer of continuous film that is deposited in a concavo-convex pattern following a concavo-convex pattern of a layer below the recording layer. It will also be appreciated that various exemplary embodiments of the present invention are applicable to magnetic disks of a longitudinal recording type. Various exemplary embodiments of the present invention are also applicable to magnetic recording media of two-sided recording type in which recording layers and the like are formed on both sides of the substrate. Furthermore, various exemplary embodiments of the present invention may also be applied to magneto-optical discs such as MO, heat assisted magnetic disks which use magnetism and heat in combination, and magnetic tapes and other magnetic recording media of non-disk configuration that have a recording layer of concavo-convex pattern.

EXAMPLES

Working Example 1

A magnetic recording medium 10 was produced according to the foregoing first exemplary embodiment.

Specifically, in the starting body of the workpiece 40 preparing step (S102), the recording layer 14 was deposited to be of a thickness of 20 nm.

In the resin layer forming step (S104), a UV curable resin was used as the resin material, and the resin layer 46 having a concavo-convex pattern corresponding to that of the recording layer 14 was formed by an optical imprinting method.

In the recording layer processing step (S106), the recording layer 14 was processed such that the recording elements 14A in the data regions had a radial width of 50 nm at the top surface and the concave portions 16 had a radial width of 50 nm at the same level as the top surfaces of the recording elements 14A. The difference in level between the top surfaces of the recording elements 14A and the bottom surfaces of the concave portions 16 was 20 nm.

In the main filler material depositing step (S108), the main filler material 17 of Si was deposited to a thickness of 100 nm by a bias sputtering method. Here, the vacuum chamber was initially supplied with only Ar gas (first stage). When the deposition of the main filler material 17 proceeded until the main filler material 17 in the concave portions 16 reached a thickness of approximately 18.5 nm and the top surfaces of the main filler material 17 in the concave portions 16 reached a height approximately 1.5 nm below the top ends of the concave portions 16, the vacuum chamber started being supplied with $O_2$ gas in addition to the Ar gas (second stage). The flow ratio between the Ar gas and the $O_2$ gas was 1:1. The deposition condition was as follows.

Source power (the power applied to the target): 500 W
    Bias power (the power applied to the workpiece 40): 100 W
    Inner pressure of chamber: 0.3 Pa
    Distance between the target and the workpiece: 300 mm
    The flow rate of the Ar gas: 50 sccm (first stage): 25 sccm (second stage)
    The flow rate of the $O_2$ gas: 0 sccm (first stage): 25 sccm (second stage).

In the flattening step (S110), the main filler material 17 at the concave portions 16 was removed to the level of the top surfaces of the recording elements 14A by IBE using Ar gas. The main filler material 17 over the recording elements 14A was removed completely. The etching condition was as follows.

The flow rate of the Ar gas: 11 sccm
    Inner pressure of chamber: 0.03 Pa
    Irradiation angle of the processing gas: 90°
    Beam voltage: 1000 V
    Beam current: 500 mA
    Suppressor voltage: −400 V.

The protective layer depositing step (S112) and the lubricant layer depositing step (S114) were further performed to produce the magnetic recording medium 10.

The resulting magnetic recording medium 10 was mounted on the magnetic recording and reproducing apparatus 2, and the magnetic recording and reproducing apparatus 2 was tested for flying characteristics of the magnetic head 4. The test result showed stable flying characteristics.

The magnetic recording and reproducing apparatus 2 was also tested for recording and reproducing characteristics. The result showed favorable recording and reproducing characteristics.

Next, the magnetic recording medium 10 was dismounted from the magnetic recording and reproducing apparatus 2 and was stored in a high-temperature high-humidity environment of 85° C. in temperature and 80% in relative humidity for 48 hours. With the magnetic recording medium 10 mounted on the magnetic recording and reproducing apparatus 2 again, the magnetic recording and reproducing apparatus 2 was then tested for flying characteristics of the magnetic head 4 and for recording and reproducing characteristics. The magnetic recording and reproducing apparatus 2 showed stable flying characteristics of the magnetic head 4 as with before the magnetic recording medium 10 was stored in the high-temperature high-humidity environment. The magnetic recording and reproducing apparatus 2 also showed favorable recording and reproducing characteristics as with before the magnetic recording medium 10 was stored in the high-temperature high-humidity environment.

Working Example 2

A glass substrate having a flat surface was prepared. The main filler material 17 of Si was deposited on the glass substrate to a thickness of 100 nm by a bias sputtering method under the same condition as in the main filler material depositing step (S108) of Working Example 1. The vacuum chamber was initially supplied with only Ar gas. When the main filler material 17 reached a thickness of approximately 18.5 nm, the vacuum chamber started being supplied with $O_2$ gas in addition to the Ar gas.

Under the same condition as in the flattening step (S110) of Working Example 1, a 80-nm portion of the deposited main filler material 17 lying on an upper side (on the side opposite from the glass substrate) was removed by IBE using Ar gas.

Further, a 4-nm-thick protective film of DLC was deposited on the remaining main filler material 17.

Figure 17:
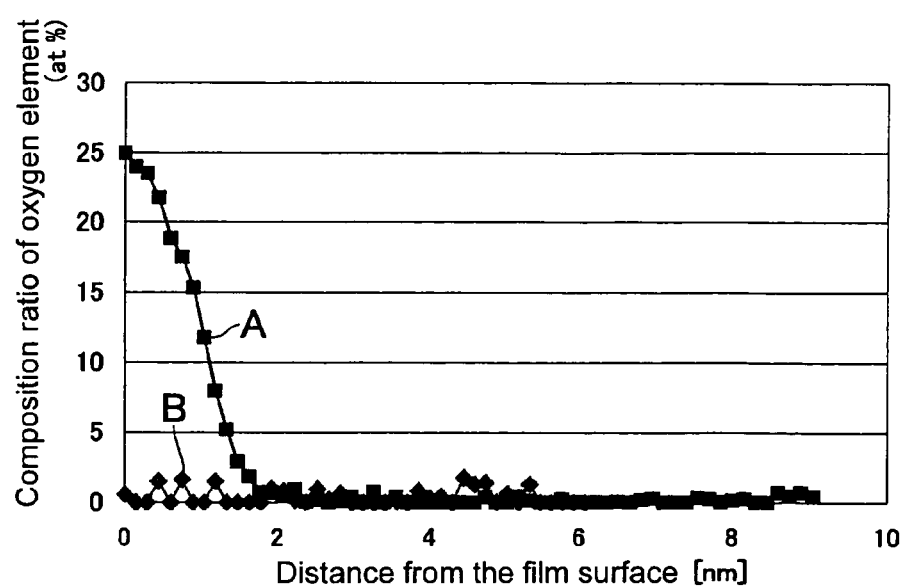
FIG. 17 is a graph showing element profiles of Working Example 2 and Comparative Example 2 taken along the thickness directions of the samples.

The resulting sample A was etched from the surface while the amounts of elements sputtered were detected to measure an element profile along the thickness direction of the sample A (the relationship between the position in the thickness direction of the sample A and the composition ratio of a constituent element) by Auger electron spectroscopy. FIG. 17 shows the measurements. The curve denoted by the symbol A shows the measurements on the sample A of Working Example 2.

Comparative Example 1

In comparison to the foregoing Working Example 1, a filler material of $SiO_2$ was deposited to a thickness of 100 nm in a filler material depositing step (equivalent to the main filler material depositing step of Working Example 1) In the filler material depositing step, no $O_2$ gas was supplied to the vacuum chamber. In the flattening step, the $SiO_2$ filler material over the concave portions 16 was etched to the level of the top surfaces of the recording elements 14A. A magnetic recording medium was thus produced under otherwise the same condition as in Working Example 1.

The resulting magnetic recording medium was mounted on the magnetic recording and reproducing apparatus, and the magnetic recording and reproducing apparatus was tested for flying characteristics of the magnetic head. The test result showed stable flying characteristics.

The magnetic recording and reproducing apparatus was also tested for recording and reproducing characteristics. The result showed favorable recording and reproducing characteristics.

As in Working Example 1, the magnetic recording medium was dismounted from the magnetic recording and reproducing apparatus and was stored in a high-temperature high-humidity environment of 85° C. in temperature and 80% in relative humidity for 48 hours. With the magnetic recording medium mounted on the magnetic recording and reproducing apparatus again, the magnetic recording and reproducing apparatus was then tested for flying characteristics of the magnetic head and for recording and reproducing characteristics. The magnetic head showed stable flying characteristics as with before the magnetic recording medium was stored in the high-temperature high-humidity environment. In contrast, the magnetic recording and reproducing apparatus showed a change in the recording and reproducing characteristics as compared to before the magnetic recording medium was stored in the high-temperature high-humidity environment. Specifically, the reproducing signal dropped in S/N ratio by approximate 0.5 dB from before the storage of the magnetic recording medium in the high-temperature high-humidity environment. Note that no occurrence of corrosion was observed on the surface of the magnetic recording medium both before and after the storage in the high-temperature high-humidity environment. The diffusion of O (oxygen) contained in the SiO₂ filler material into the recording elements probably lowered the S/N ratio of the reproducing signal after the storage in the high-temperature high-humidity environment as compared to before the storage in the high-temperature high-humidity environment.

Comparative Example 2

In comparison to Working Example 2, the main filler material depositing step (S108) was performed without the supply of the O₂ gas. A sample B was produced under otherwise the same condition as in Working Example 2.

The resulting sample B was measured for an element profile along the thickness direction of the sample B by the same method as in Working Example 2. FIG. 17 shows the measurements. The curve denoted by the symbol B shows the measurements on the sample B of Comparative Example 2.

As has been described, in the main filler material depositing step (S108) of Working Example 1, the vacuum chamber was initially supplied with only the Ar gas to deposit a main filler material of Si, and then the vacuum chamber started being supplied with the O₂ gas in addition to the Ar gas when the deposition of the main filler material 17 proceeded until the top surfaces of the main filler material 17 in the concave portions 16 reached a height approximately 1.5 nm below the top ends of the concave portions 16. It was confirmed that such Working Example 1 yielded the favorable flying characteristics of the magnetic head as with Comparative Example 1 where the SiO₂ filler material was deposited to form the filler portions. Working Example 1 also provided more favorable recording and reproducing characteristics than Comparative Example 1.

As shown in FIG. 17, the Si film of Comparative Example 2 contained little oxygen, being deposited without the supply of O₂ gas in the step of depositing a main filler material (S108). In contrast, it was confirmed that the Si film of Working Example 2, where the vacuum chamber was initially supplied with only the Ar gas and then started being supplied with the O₂ gas in addition to the Ar gas when the main filler material 17 reached a thickness of approximately 18.5 nm, contained oxygen in the portion corresponding to the upper surface portions of 2 nm or so from the surface. It was also confirmed that the ratio of the number of oxygen atoms decreased substantially continuously toward the substrate side in the portion, corresponding to the upper surface portion, of the Si film. Furthermore, it was confirmed that the Si film of Working Example 2 contained little oxygen in the portion corresponding to the lower portions. In other words, it was confirmed that oxygen could be unevenly distributed in the filler portion so that the ratio of the number of oxygen atoms to the total of the number of atoms of the main filler material and the number of oxygen atoms was greater in the upper surface portion of the filler portion than in the lower portion of the filler portion, by initially supplying the vacuum chamber with only an inert gas such as Ar and then starting to supply the vacuum chamber with O₂ gas in addition to the Ar gas from the middle. Note, in FIG. 17, that a part of the curve denoted by the symbol A lying in the area above 2 nm from the surface of the Si film and the curve designated by the symbol B locally show values greater than zero. This is probably due to noise, not indicating the presence of oxygen.

A description will finally be given of an example of the method for checking the filler portions 18 of the magnetic recording medium 10 for the composition ratios of constituent elements.

Initially, the lubricant layer 30 is removed from the magnetic recording material 10, and the protective layer 28 is coated with a carbon to a thickness of 20 nm or so. Subsequently, a portion including recording elements 14A and filler portions 18 is cut by the FIB (Focused Ion Beam) method along cutting plane parallel with the thickness direction and radial direction of the magnetic recording medium such that the cut portion has a thickness of 50 nm or so, whereby a sectioned TEM sample is prepared. This sample preparation can be performed by using FB2100 (manufactured by Hitachi High-Technologies Corporation) or the like, for example.

The resulting sample is subjected to TEM (Transmission Electron Microscope) observation and EDS (Energy-Dispersive x-ray Spectroscopy) analysis at a plurality of positions in the thickness direction (of the substrate 12) to obtain a profile (a graph on which the relationship between the position in the thickness direction of the sample and the composition ratio of a constituent element is plotted). This measurement can be performed by using FE-TEM (JEM-2100F manufactured by JOEL Ltd.) or FE-STEM (HD2000 manufactured by Hitachi High-Technologies Corporation), for example. If the composition ratio of the number of oxygen atoms is difficult to analysis, the composition ratios of elements other than oxygen can be measured to calculate the composition ratio of oxygen.

INDUSTRIAL APPLICABILITY

The present invention is applicable to a magnetic recording medium having a recording layer formed in a concavo-convex pattern, such as a discrete track medium and a patterned medium.

REFERENCE SIGNS LIST

2—magnetic recording and reproducing apparatus
4—magnetic head
10, 50—magnetic recording medium
12—substrate
14—recording layer
14A—recording element
16—concave portion
18—filler portion
18A—upper surface portion
18B—lower portion
24—soft magnetic layer
26—seed layer
28—protective layer
30—lubricant layer
40, 60—workpiece
42—first mask layer
44—second mask layer
46—resin layer
52—barrier film
S102—starting body of workpiece preparing step
S104—resin layer forming step
S106—recording layer processing step
S108—main filler material depositing step
S110—flattening step
S112—protective layer depositing step
S114—lubricant layer depositing step

The invention claimed is:
1. A magnetic recording medium comprising:
a substrate;
a recording layer formed in a predetermined concavo-convex pattern over the substrate, convex portions of the concavo-convex pattern serving as recording elements; and a filler portion filling a concave portion between the recording elements, wherein the filler portion comprises a metal-based main filler material and oxygen, the oxygen being unevenly distributed in the filler portion so that the filler portion contains oxygen only in an upper half of the filler portion in a thickness direction while a lower half of the filler portion in the thickness direction contains no oxygen.

2. The magnetic recording medium according to claim 1, wherein the main filler material includes at least one of Si, Al, Ti, Ta, Nb, Zr, Au, Cu, Ir, Ru, Pt, Rh, Cr, W, and Zn.

3. A magnetic recording and reproducing apparatus comprising:

the magnetic recording medium according to claim 1; and a magnetic head for recording and reproducing a magnetic signal on/from the magnetic recording medium.

4. A magnetic recording and reproducing apparatus comprising:

the magnetic recording medium according to claim 2; and a magnetic head for recording and reproducing a magnetic signal on/from the magnetic recording medium.

* * * * *